(12) United States Patent
Taniguchi et al.

(10) Patent No.: US 10,857,946 B2
(45) Date of Patent: Dec. 8, 2020

(54) SHUTTER

(71) Applicant: NIFCO INC., Yokosuka (JP)

(72) Inventors: Katsuhiko Taniguchi, Yokosuka (JP);
Seonkyu Lim, Yokosuka (JP)

(73) Assignee: NIFCO INC., Yokosuka (JP)

( * ) Notice: Subject to any disclaimer, the term of this patent is extended or adjusted under 35 U.S.C. 154(b) by 92 days.

(21) Appl. No.: 15/759,353

(22) PCT Filed: Sep. 8, 2016

(86) PCT No.: PCT/JP2016/076463
§ 371 (c)(1),
(2) Date: Mar. 12, 2018

(87) PCT Pub. No.: WO2017/043579
PCT Pub. Date: Mar. 16, 2017

(65) Prior Publication Data
US 2018/0251072 A1 Sep. 6, 2018

(30) Foreign Application Priority Data
Sep. 11, 2015 (JP) .................................. 2015-179606

(51) Int. Cl.
*B60R 7/04* (2006.01)
*B60R 11/00* (2006.01)
*B65D 43/20* (2006.01)

(52) U.S. Cl.
CPC ......... *B60R 7/04* (2013.01); *B60R 2011/0094* (2013.01); *B65D 43/20* (2013.01)

(58) Field of Classification Search
CPC ........................ B60R 2011/0094; B65D 43/20
(Continued)

(56) References Cited

U.S. PATENT DOCUMENTS 2,054,499 A    9/1936  Florman
2,690,216 A    9/1954  Scott
(Continued)

FOREIGN PATENT DOCUMENTS

DE    102013107064 A1    7/2014
EP        2848404 A1    3/2015
(Continued)

OTHER PUBLICATIONS

Europe Patent Office, "Search Report for European Patent Application No. 16844440.4," dated Jan. 4, 2019.
(Continued)

*Primary Examiner* — Anthony D Stashick
*Assistant Examiner* — Raven Collins
(74) *Attorney, Agent, or Firm* — Manabu Kanesaka (57) ABSTRACT

A shutter is formed to be capable of bending in a sliding direction, and slides along a pair of guide grooves including a curved portion at one portion thereof, the guide grooves being provided on two sides, facing each other, of an opening of a device main member and a shutter storage side, to open and close the opening. The shutter includes a shutter base material sliding along the guide grooves in a state wherein corresponding portions fit into the guide grooves; and a hinge base material disposed on an outer face of the shutter base material. Also, the hinge base material is a sheet formed by a continuous fiber reinforced plastic or a sheet produced using a pre-preg material.

7 Claims, 10 Drawing Sheets

(58) Field of Classification Search
USPC .................. 220/350, 483, 345.1; 16/385
See application file for complete search history.

(56) References Cited

U.S. PATENT DOCUMENTS

| | | | | |
|---|---|---|---|---|
| 6,883,852 | B2* | 4/2005 | Laskey | B60N 3/102 |
| | | | | 220/350 |
| 7,475,954 | B1 | 1/2009 | Latunski | |
| 8,726,971 | B2* | 5/2014 | Sato | B60R 7/04 |
| | | | | 160/231.2 |
| 10,030,441 | B2 | 7/2018 | Piccin | |
| 2003/0173040 | A1* | 9/2003 | Court | B60J 5/14 |
| | | | | 160/230 |
| 2007/0102463 | A1* | 5/2007 | Thomas | B60R 7/04 |
| | | | | 224/275 |
| 2012/0024857 | A1* | 2/2012 | Kodama | B65D 43/20 |
| | | | | 220/350 |
| 2012/0305202 | A1* | 12/2012 | Ganz | B60N 3/08 |
| | | | | 160/133 |

FOREIGN PATENT DOCUMENTS

| | | |
|---|---|---|
| JP | S54-73439 A | 6/1979 |
| JP | H05-86777 A | 4/1993 |
| JP | 3023940 U | 5/1996 |
| JP | H09-193952 A | 7/1997 |
| JP | 2008-120317 A | 5/2008 |
| JP | 2013-147223 A | 8/2013 |
| JP | 2013-204256 A | 10/2013 |
| JP | 2014-218150 A | 11/2014 |

OTHER PUBLICATIONS

PCT/ISA/210, "International Search Report for International Application No. PCT/JP2016/076463," dated Oct. 11, 2016.

Europe Patent Office, "Search Report for European Patent Application No. 20158315.0," dated May 6, 2020.

* cited by examiner

Width direction

FIG. 10(b)
Prior Art

Front ← → Rear

SHUTTER

FIELD OF TECHNOLOGY

The present invention relates to a shutter which opens and closes an opening of a device main member.

BACKGROUND ART

Figure 9A:
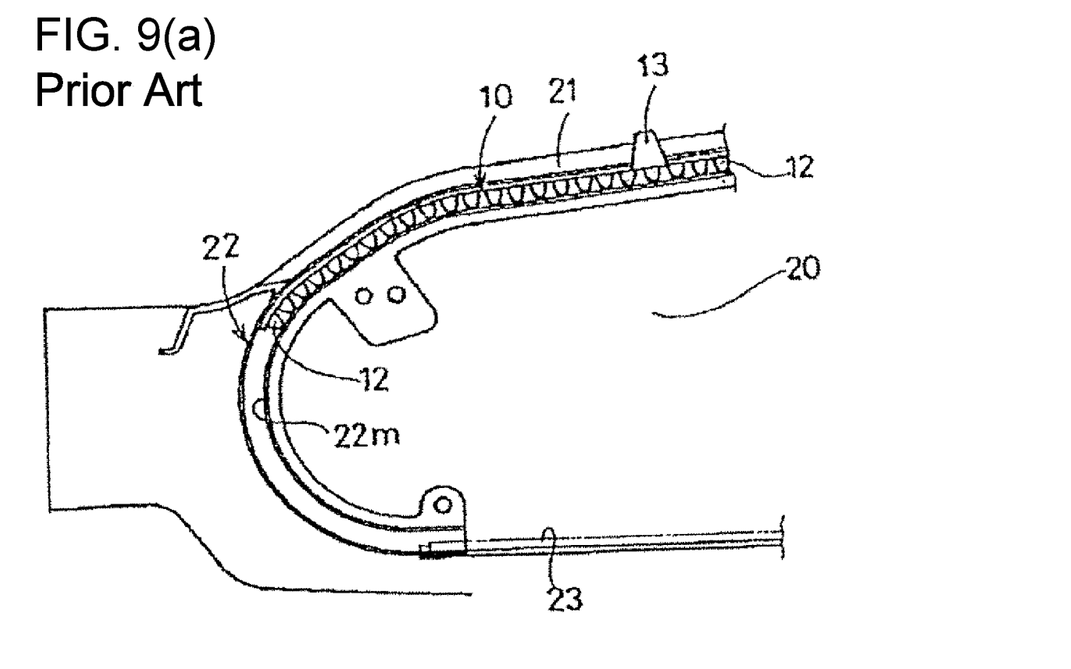
FIGS. 9(a) and 9(b) are drawings showing shutter (lid) essential parts disclosed in Patent Document 1.
Figure 9B:
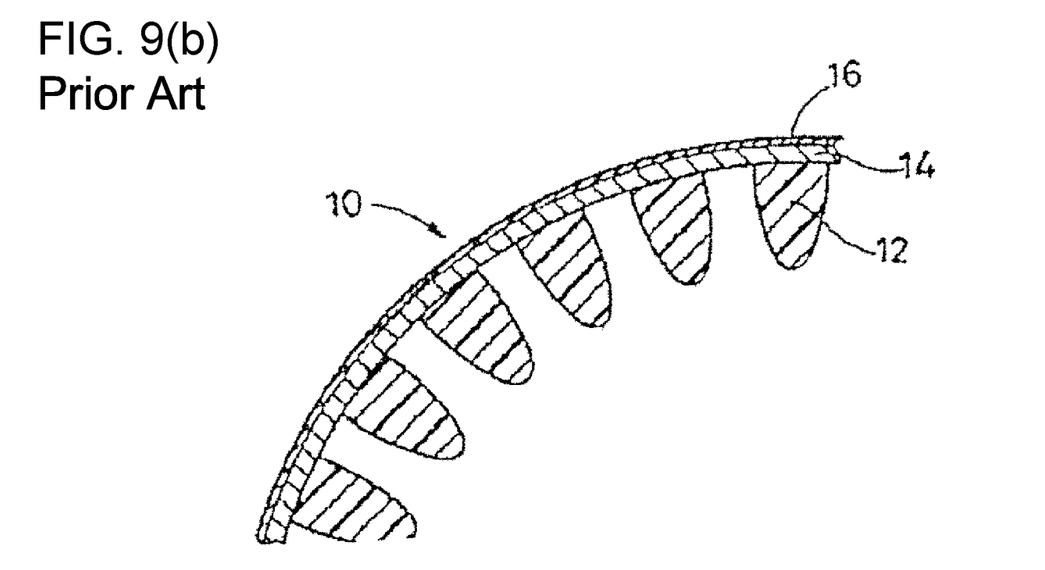

FIGS. 9(a) and 9(b) show an invention disclosed in Patent Document 1. The shutter (lid) 10 is formed by a plurality of rods 12 arranged side by side at intervals in a sliding direction; a cushioning sheet 14 connecting each rod 12 in such a way so as to easily bend between the rods in a state wherein upper faces of the respective rods 12 are covered; and a decorative film 16 firmly attached to the cushioning sheet 14. Also, the shutter 10 opens and closes an opening portion 21 by sliding in a state wherein both end portions in a width direction are fitted into a guide groove 22 provided in a box and including a curved portion. In the aforementioned shutter structure, the cushioning sheet 14 is interposed between the rods 12 and the decorative film 16 in such a way so as to fit in the curved portion to prevent a local bend, so that a damage such as cracking whitening and the like due to a local load, which is a factor of a deterioration in appearance, is difficult to occur. Here, as for materials of structural members, the rod 12 is made of resin which can ensure rigidity 20 and strength, the cushioning sheet 14 is made of nonwoven fabric or felt, and the decorative film 16 is made of polyvinyl chloride with a pattern printed.

Figure 10A:
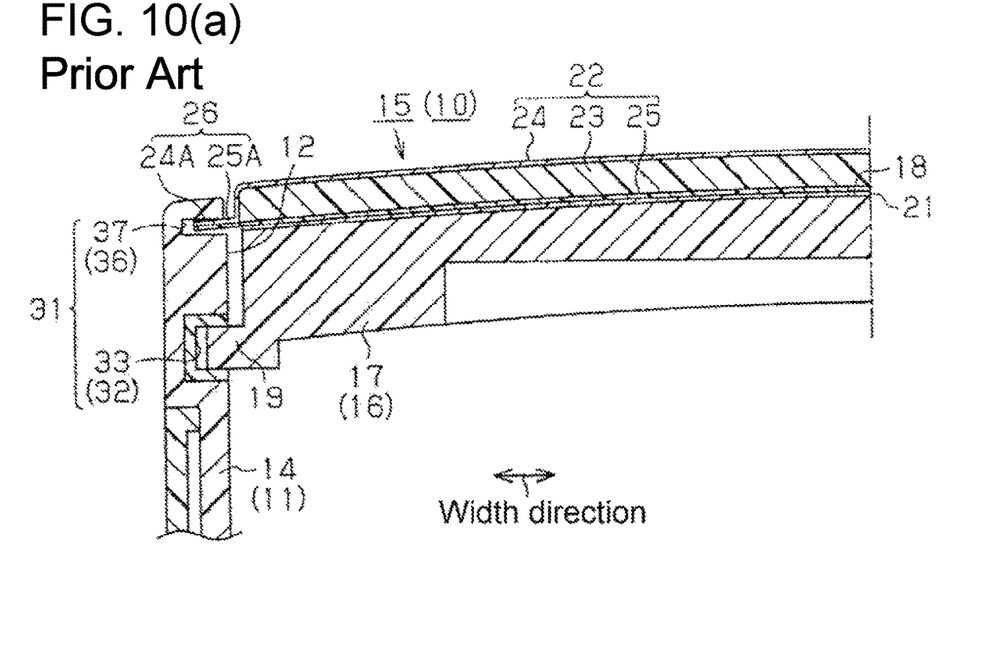
FIGS. 10(a) and 10(b) are drawings showing the shutter essential parts disclosed in Patent Document 2.
Figure 10B:
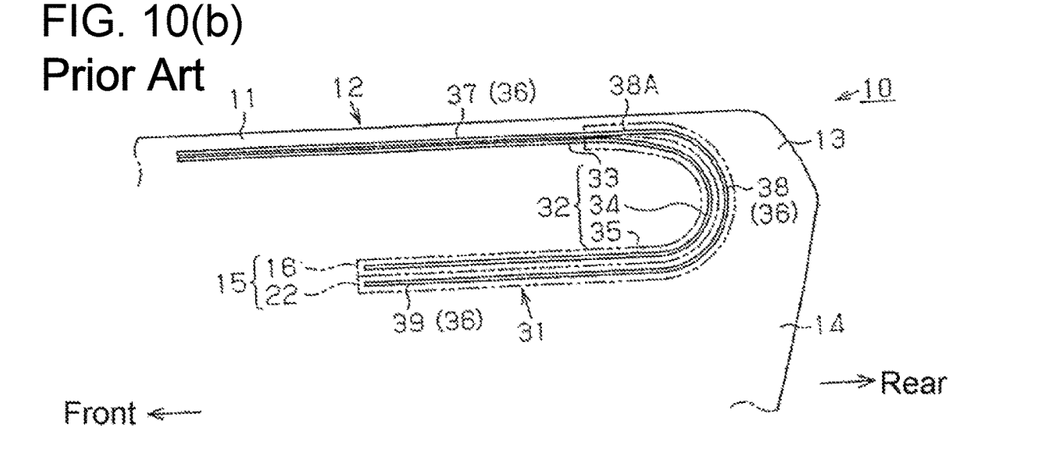

FIGS. 10(a) and 10(b) show an invention disclosed in Patent Document 2. The shutter 15 has an object of an improvement in design, and is divided into a main shutter 16 wherein a plurality of shutter structural members 17 providing the rigidity and strength is bendably connected to a fabric tape 21; and a flexible sub-shutter 22 connected to the main shutter 16, placed outside the main shutter, and formed by a soft portion 23, a surface skin 24 on an outer face, and a sheet 25 on an inner face. Also, as for a shape change portion, the shutter structural member 17 includes a curved face 18 projecting outwardly in the width direction. A pair of guide groove portions 31 provided in a main member 11 is divided into a main guide groove 32 including a main straight groove portion 33 and a main curved groove portion 34; and a sub-guide groove 36 including a sub-straight groove portion 37 and a sub-curved groove portion 38. Also, as for the shape change portion, an interval between the main straight groove portion 33 and the sub-straight groove portion 37 is set to be narrow, and an interval between the main curved groove portion 34 and the sub-curved groove portion 38 is set to be wide. In the aforementioned sub-shutter 22, due to the shape change portion, when guided by the sub-straight groove portion 37, the sub-shutter 22 has the first shape of forming a straight shape in the sliding direction, and of curving in such a way so as to project outwardly in the width direction. Also, when guided by the sub-curved groove portion 38, the sub-shutter 22 has a second shape of curving in such a way so as to project outwardly along the same groove portion in the sliding direction, and of becoming flat in the width direction. Here, as for the materials of the structural members, the shutter structural member 17 is made of rigid resin, the fabric tape 21 is made of nonwoven fabric, the soft portion 23 is made of soft resin, the surface skin 24 is made of elastic resin, and the sheet 25 is made of polycarbonate.

PRIOR ART DOCUMENTS

Patent Documents

Patent Document 1: Japanese Unexamined Patent Application Publication No. H09-193952
Patent Document 2: Japanese Unexamined Patent Application Publication No. 2013-204256

SUMMARY OF THE INVENTION

Problems to be Solved by the Invention

In the aforementioned shutter structure of the Patent Document 1, there is a possibility that the pattern applied to the decorative film gradually becomes distorted due to long-time use so as to deteriorate the appearance. The main cause is because even if the local load is difficult to be received at the curved portion of the guide groove as little as possible, in the cushioning sheet corresponding to a hinge base material of the present invention, a creep deformation locally occurs, so that the cushioning sheet does not return to its original shape. As for a measure for the above, when the creep deformation is attempted to be reduced by changing a thickness in the cushioning sheet, for example, if the thickness is set to be thick, an operating force at a sliding time increases, and if the thickness is set to be thin, a bend line can be seen due to the local load and the like receiving at the curved portion of the guide groove so as to damage the appearance. The aforementioned problems occur likewise in a case wherein a pattern is provided on an upper face of the soft portion (corresponding to the hinge base material of the present invention) forming the shutter structure of the Patent Document 2, i.e., the sub-shutter, or in a case wherein the decorative film where the pattern is printed is provided in place of the surface skin as well.

Here, an object of the present invention is to provide a shutter eliminating the deterioration in appearance due to the creep deformation which can easily occur in the hinge base material among the structural members of the shutter, and excellent in the degree of freedom for adjusting the operating force. Other objects will be clarified in the following explanations.

Means for Solving the Problems

In order to obtain the aforementioned object, although the present inventors have examined materials and specifications having a high creep-resistant property to prevent a deterioration in appearance due to the aforementioned creep deformation as a subject of a hinge base material forming a shutter, the present inventors could not be satisfied with conventionally used materials made of resin, nonwoven fabric, or felt. However, as for the hinge base material, the present inventors have found that a sheet produced by using a sheet formed of continuous fiber reinforced plastic, or a pre-preg material excels in strength, rigidity, toughness, and a heat-resisting property compared to a conventional resin molded article, nonwoven fabric, and the like, and can be easily bent by reducing a thickness as well. Also, the present inventors have found that the sheet formed by the continuous fiber reinforced plastic, or the sheet produced by using the pre-preg material excels in a creep-resistant property, and that in a condition of firmly attaching a decorative film wherein a pattern is printed, even in a high temperature in midsummer conventionally regarded as a problem, a thermal deformation is difficult to occur, and that the sheet formed of the continuous fiber reinforced plastic, or the sheet produced by using the pre-preg material can solve a possibility that the sheet does not return to its original shape by the conventional creep deformation.

In a shutter according to the present invention, which is formed to be capable of bending in a sliding direction, and which slides along a pair of guide grooves including a curved portion at one portion thereof, the guide grooves being provided on two sides, facing each other, of an opening of a device main member and a shutter storage side, to open and close the opening, the shutter comprises a shutter base material sliding along the guide grooves in a state wherein corresponding portions fit into the guide grooves; and a hinge base material disposed on an outer face of the shutter base material. Also, the hinge base material is a sheet formed of continuous fiber reinforced plastic.

In the present invention, the sheet formed of the continuous fiber reinforced plastic may be a sheet produced by using the pre-preg material. Incidentally, in the following explanation, the "sheet produced by using the pre-preg material" is called a "pre-preg sheet" for short.

Here, in the present invention, the hinge base material is a member forming a design surface, and includes a member which firmly attaches the decorative film wherein a pattern such as a wood grain and the like is printed at least on an upper face as well. In the present invention, a specific description of "the hinge base material is a sheet formed of continuous fiber reinforced plastic" has significance in specifying the above from a raw material structure of a material regardless of a production procedure. In the present invention, a specific description of "the sheet formed by the continuous fiber reinforced plastic is a sheet produced by using the pre-preg material" is distinguished from the case wherein "the hinge base material is a sheet formed by the continuous fiber reinforced plastic" in that an intermediate material before molding wherein fiber and resin are combined is used. Namely, the case wherein "the sheet formed by the continuous fiber reinforced plastic is a sheet produced by using the pre-preg material" has significance in specifying the above from a production procedure structure of using the intermediate material. Additionally, the sheet formed by the continuous fiber reinforced plastic and the pre-preg sheet are the same in that the raw material structure of the material includes a resin material for matrix in a reinforced fiber material. However, for the pre-preg sheet, it is essential to use the pre-preg material which is the intermediate material, and the pre-preg sheet is distinguished from the sheet formed by the continuous fiber reinforced plastic which does not comply whether or not the intermediate material is used.

In details, the continuous fiber reinforced plastic and the pre-preg material have a structure of including thermosetting resin or thermoplastic resin as for the resin material for matrix in a carbon fiber, a glass fiber, and the like as for the reinforced fiber material. As a specific example, there are included a material wherein a resin film is laminated on the reinforced fiber material, and is impregnated by heating and applying a pressure; a material wherein a minute plastic particle is entangled in the reinforced fiber material; a material wherein the reinforced fiber material and a plastic fiber material are mixed; and the like. The resin material for matrix is the thermosetting resin such as epoxy resin, polyester resin, and the like, or the thermoplastic resin such as polyamide resin, polypropylene resin, vinyl chloride resin, and the like.

As for the resin material for matrix, the material using a thermoplastic resin material has an excellent recycling property, and has an excellent adhesive property compared to the material wherein the thermosetting resin is impregnated or combined. The material using a thermosetting resin material has an excellent heat-resisting property or an excellent chemical resistant property compared to the material wherein the thermoplastic resin is impregnated or combined, and has a low viscosity in a melting state, and can be uniformly combined so as to have excellent appearance characteristics.

As for the reinforced fiber material, for example, there are the carbon fiber, the glass fiber, a graphite fiber, an alumina fiber, a silicon carbide fiber, a boron fiber, a steel fiber, an amorphous fiber, an organic fiber, and the like, and the above-mentioned fibers can be used individually, or used by combining two kinds or above. An embodiment of the fiber may be, for example, any of a continuous fiber, a long fiber, a short fiber, and a composite fiber wherein the above-mentioned fibers are mixed. Also, as for a fiber direction or an arrangement aspect, there may be any of a single direction, a random direction, a sheet form, a mat form, a woven fabric form, and a braid form. Also, the aforementioned reinforced fiber material may be selected from the following structures.

(A) The reinforced fiber material is formed by the continuous fiber. The continuous fiber has an aspect wherein the short fiber or the long fiber is arranged or presented in a roughly same direction in resin for matrix, namely, an aspect wherein a direction of the fiber is nearly uniform, and is not at random nor discontinuous. In the aforementioned structure, for example, for allowing the shutter to curve in the sliding direction, a point where the shutter bends is clear, and the operating force can be easily adjusted so as to constantly maintain the operating force.

(B) The reinforced fiber material is formed by a woven fabric. The woven fabric may be any of a plain weave, a twill weave, and a sateen weave by a combination of a vertical thread and a horizontal thread. The plain weave is a simple and robust weave structure wherein the vertical threads and the horizontal threads are structured by mutually crossing one by one. The pre-preg sheet using the plain weave has uniform tensile strength in vertical and horizontal directions. The twill weave has a weave structure wherein two or more vertical threads and horizontal threads are weaved in succession. The pre-preg sheet using the twill weave has a soft feeling more than the plain weave. The sateen weave is structured by five or more vertical and horizontal threads, and has a weave structure wherein either of the vertical threads or the horizontal threads rise to a surface. The reinforced fiber material wherein the woven fabric is used as for a reinforced fiber can strengthens the strength and rigidity.

(C) The woven fabric has a structure wherein the number of the fibers in the shutter sliding direction is fewer than the number of the fibers in a direction of intersecting relative to the shutter sliding direction. In the woven fabric, if the number of the fibers arranged in the shutter sliding direction is less than the number of the fibers in the direction of intersecting relative to the sliding direction, for example, in a state wherein the strength of the shutter is maintained, the operating force can be adjusted low so as to increase the degree of freedom of design.

(D) The pre-preg material has a structure formed by a UD (Uni-Direction) tape wherein the fibers are aligned in one direction. The UD tape is the pre-preg material using a unidirectional continuous fiber, has a point where the shutter bends is clear, and can easily adjust the operating force so as to easily maintain the operating force to be constant. Also, the UD tape has excellent fluidization at a molding time, and even with a slightly complicated shape, has an excellent following property so as to obtain a consistent laminate structure.

Also, the aforementioned shutter base material and hinge base material may have any of a structure wherein as shown in an example of the first embodiment of the present invention, only the corresponding portion of the shutter base material slidably fits into the guide groove; a structure wherein as shown in an example of a second embodiment of the present invention, the shutter base material and the hinge base material can slide in a state wherein respective corresponding portions of the shutter base material and the hinge base material respectively fit into the guide groove; and further a structure wherein as shown in Patent Document 2, the respective corresponding portions of both members slidably fit into separated guide grooves, respectively. Among those structures, in a case of the second embodiment of the present invention, compared to the first embodiment of the present invention, a stress applied to the curved portion of the guide groove is dispersed by the shutter base material and the hinge base material so as to maintain a more stable sliding state, and compared to the Patent Document 2, the number of structural members is few, and for a portion that the number of the guide groove is reduced, the second embodiment of the present invention is simplified, and can easily ensure a storage space widely.

Also, the aforementioned shutter can be applied as a lid of a vehicle glove compartment. This is because the vehicle glove compartment is exposed to a high temperature environment in midsummer, or is strongly desired so that an appearance is maintained for a long period of time. A small article container is not limited to a type wherein the opening is long in front and back or right and left as shown in each embodiment, and may have a type wherein the opening is long up and down (for example, a structure as shown in Japanese Patent No. 4680452).

Effect of the Invention

In the present invention, the hinge base material forming the shutter is the sheet formed of the continuous fiber reinforced plastic, or the pre-preg sheet, and improves the strength, the rigidity, and the toughness compared to the conventional resin molded article, nonwoven fabric, and the like, and can be easily curved by reducing the thickness as well. Also, in a case where the decorative film wherein the pattern is printed is firmly attached to the sheet formed of the continuous fiber reinforced plastic, or to the pre-preg sheet, the thermal deformation is difficult to occur, and the aforementioned sheets excel in the creep-resistant property so as to solve the problem of the deterioration in appearance due to the aforementioned creep deformation.

BRIEF DESCRIPTION OF THE DRAWINGS

FIGS. 1(a) and 1(b) show a small article container device wherein a shutter of the first embodiment of the present invention is applied, wherein

FIGS. 2(a) and 2(b) are cross-sectional views taken along line B-B in FIG. 1(a), wherein

FIGS. 4(a) and 4(b) show a shutter structure in FIG. 3, wherein

FIGS. 5(a) and 5(b) show the small article container device wherein the shutter of a second embodiment of the present invention is applied, wherein

FIGS. 8(a) and 8(b) show the shutter structure in FIG. 5, wherein

BEST MODES OF CARRYING OUT THE INVENTION

Hereinafter, embodiments of the present invention will be explained with reference to the attached drawings. FIG. 1(a) to FIG. 4(b) show the first embodiment of the present invention, and FIG. 5(a) to FIG. 8(b) show a second embodiment. In an explanation below, after invention characteristics according to the first embodiment are clarified, differences of the second embodiment will be described.

First Embodiment

A small article container device 1 shown in FIG. 1(a) to FIG. 4(b) is an example provided in a center console in an automobile, and comprises a container-shaped device main member 10 wherein an upper side thereof is open; a pair of side plates 15 assembled to both sides of the device main member 10 and dividing both sides of the opening; guide grooves 18 provided on both side plates 15 to face each other; and a shutter 2 formed to be capable of curving in a sliding direction, and opening and closing the opening by sliding along the guide grooves 18. Also, the shutter 2 is formed by a shutter base material 3 sliding along the guide groove 18 in a state wherein a corresponding portion (3a) is fitted into the guide grooves 18; a hinge base material 4 which is a sheet formed by continuous fiber reinforced plastic or a pre-preg sheet placed on an upper face of the shutter base material 3; and a decorative film 5 firmly attached to an upper face, i.e., an outer face of the hinge base material 4. Hereinafter, the details will be clarified. Incidentally, the hinge base material 4 will be explained with an example of the pre-preg sheet; however, it may be a structure of directly producing a sheet from a material of a raw material (raw material including a resin material for matrix in a reinforced fiber material) without going through an intermediate material such as a pre-preg material. The sheet formed by the continuous fiber reinforced plastic according to the present invention is thoroughly specified from a raw material structure of the material regardless of a production procedure.

In the small article container device 1, the device main member 10 and each side plate 15 are made of a resin injection molded article. The device main member 10 has a rectangular container shape long from front to back by a bottom wall 11, both side walls 12 and 12, a front wall 13, and a back wall 14. Each side plate 15 is formed by a slender straight plate portion 16 and a wide housing plate portion 17 provided at a back side of the straight plate portion 16. The guide groove 18 is formed by a straight portion 18a located on opposed inner faces of the side plates, provided in the straight plate portion 16, and extending in a front-back direction; and a curved portion 18b provided in the housing plate portion 17 and extending in an arc shape up and down. The reference numeral 19 represents attachment portions, and the attachment portions 19 are used when the small article container device 1 is fixed in a mounting portion of a console box.

Figure 3:
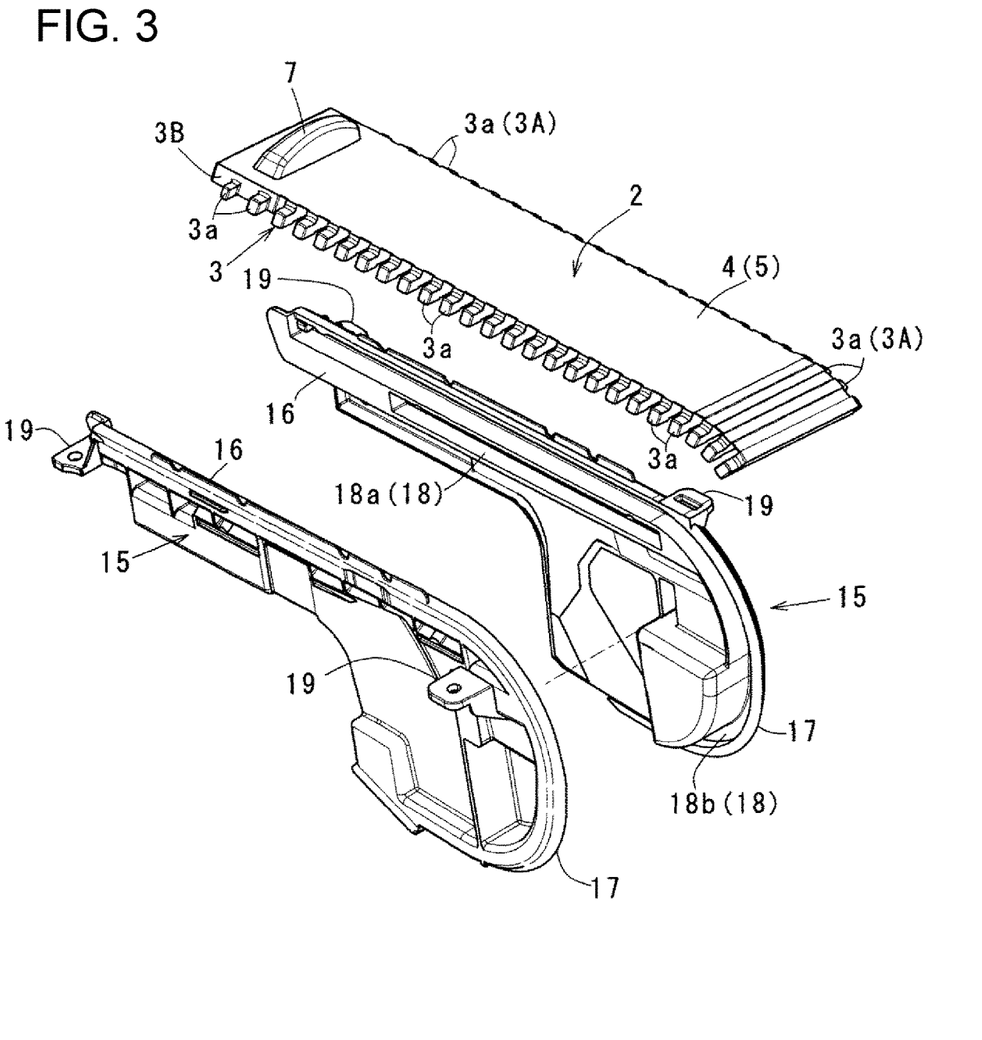
FIG. 3 is a schematic perspective view showing the shutter (a decorative film is omitted) with a guide groove of a device main member.
Figure 4A:
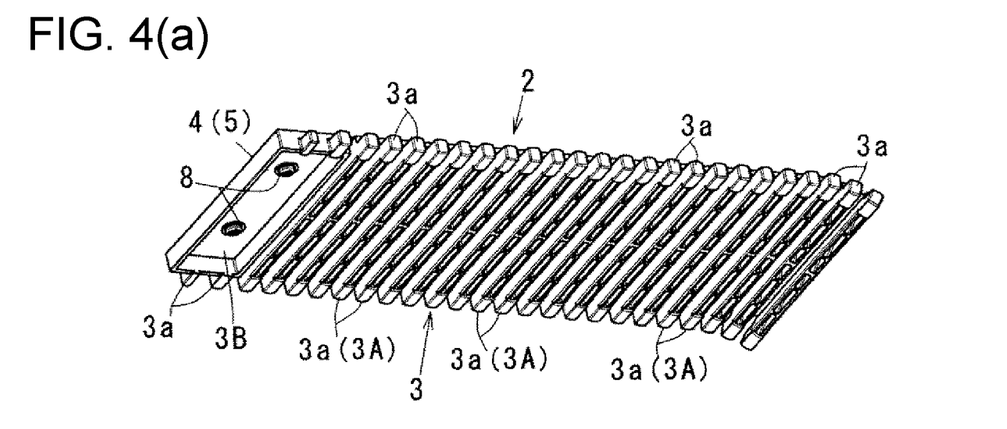
FIG. 4(a) is a perspective view in a state looked up from a lower side.
Figure 4B:
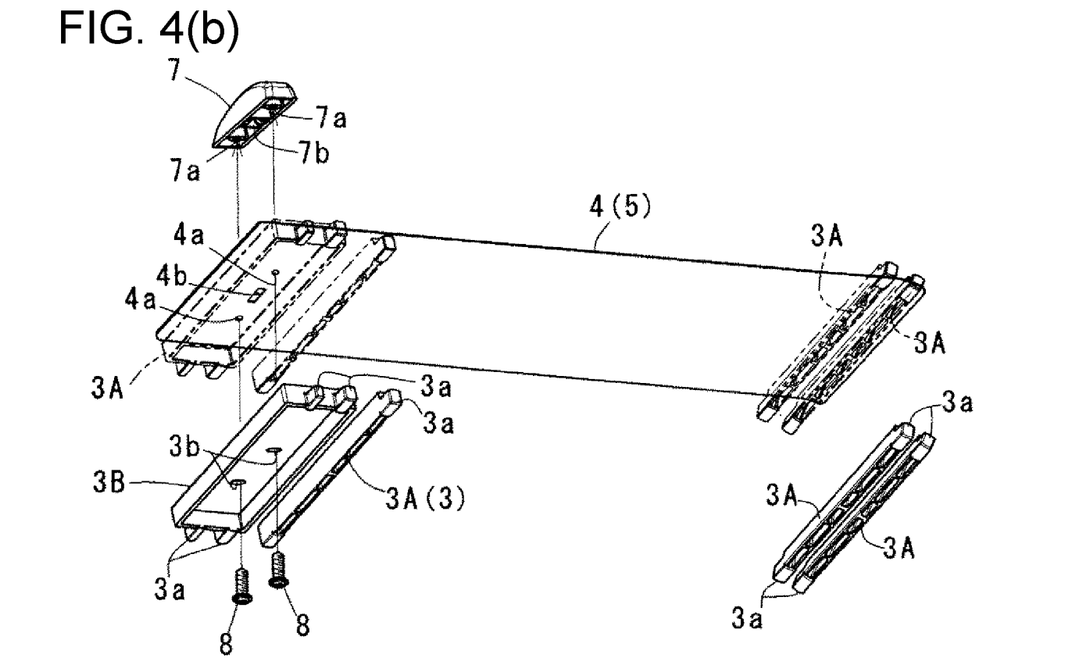
FIG. 4(b) is a structural diagram showing a relationship between a shutter base material and a hinge base material.

In the shutter 2, first, the shutter base material 3 is made of rigid resin such as PA (polyamide), polyvinyl chloride, ABS (acryl butadiene styrenic polymer) and the like, and as shown in FIG. 3 and FIGS. 4(a) and 4(b), the shutter base material 3 is structured by a plurality of piece-like rib materials 3A arranged side by side at intervals in the sliding direction; and a first plate-like rib material 3B placed in a front side (lead-out end side) and having a plate width wider than that of the piece-like rib materials 3A. At both ends of the piece-like rib material 3A, there is provided a single projection 3a, and at both end portions of the plate-like rib material 3B, there are provided two projections 3a. Each projection 3a is provided in a step shape relative to an upper face of the rib materials 3A and 3B, and is slidably fitted into the guide groove 18.

Also, each rib material 3A is located between the projections 3a, and the upper face thereof is formed in a flat face, and a lower face thereof has concave and convex shapes by the presence of a number of inverted concave-shaped notch portions. The rib material 3B is located between the projections 3a, and the upper face thereof is formed in a flat face, and a lower face thereof is formed in a shallow cavity. Also, in the rib material 3B, there are provided two through holes 3b located between the projections 3a and passed through up and down; and a positioning projecting piece 3c projecting from the upper face as shown in an enlarged view in FIG. 2(a).

The hinge base material 4 firmly attaches (the upper face of) each rib material to be integrated by maintaining a gap for bending between the rib material 3A and the rib material 3B, and between the rib materials 3A in a state wherein the hinge base material 4 covers the upper face of each rib material 3A and 3B which are the shutter base material. Namely, the shutter 2 has a structure wherein each rib material 3A and 3B is firmly attached to a lower face of the hinge base material 4 by maintaining a predetermined interval, and the hinge base material 4 is formed by the pre-preg sheet. The pre-preg sheet (hinge base material) 4 is produced by the pre-preg material wherein the resin material for matrix is impregnated or combined in the reinforced fiber material such as a carbon fiber and the like.

A thickness of the pre-preg sheet which is the hinge base material 4 is set to the thickness which can curve in a longitudinal direction. In one example of the production procedures, first, the material (pre-preg material) is cut out in a product form of an object. Secondly, the cut-out material is heated at a temperature equal to or above a melting point of the resin material for matrix by a heating device such as a heater and the like. Thirdly, the material taken out of the heating device is moved to a die in a press device to apply a pressure. Fourthly, the pressed molded member is taken out of the die after being cooled. This example is stamping mold, and in the stamping mold, a heating process, and pressing and cooling processes by the press device are divided. Compared to a method wherein the heating process and the pressing and cooling processes are carried out in succession, the aforementioned method has a short occupancy time of the press device, and is suitable for mass production.

Also, in the pre-preg sheet which is the hinge base material 4, there are provided two through holes 4a positioned at a portion corresponding to the through holes 3b of the rib material 3B; and a through hole 4b positioned between the through holes 4a and allowing the positioning projecting piece 3c to pass through. Although the respective through holes 4a and 4b may be provided by hand processing, they can be provided using the press device used in a process of producing the pre-preg sheet from the pre-preg material.

On the other hand, the decorative film 5 is, for example, a polyvinylchloride film and the like, and laminate processing or the like is applied to a transparent clear layer as a protective layer on a printed surface. Incidentally, in the drawings, a pattern applied to the decorative film 5 by printing and the like is omitted due to a restriction of drawing figures. As for the pattern, various patterns according to usage purposes can be printed other than a wood grain. The aforementioned decorative film 5 is firmly attached in such a way so as to cover the upper face of the hinge base material 4 by the same method as a conventional method. In that case, the decorative film 5 can be firmly attached at the same time as pressing the pre-preg material or after the pressing the pre-preg material using the press device used in the process of producing the pre-preg sheet from the pre-preg material. In that case, in the decorative film 5, there are provided through holes (not shown) corresponding to the aforementioned respective through holes 4a and 4b.

Figure 1A:
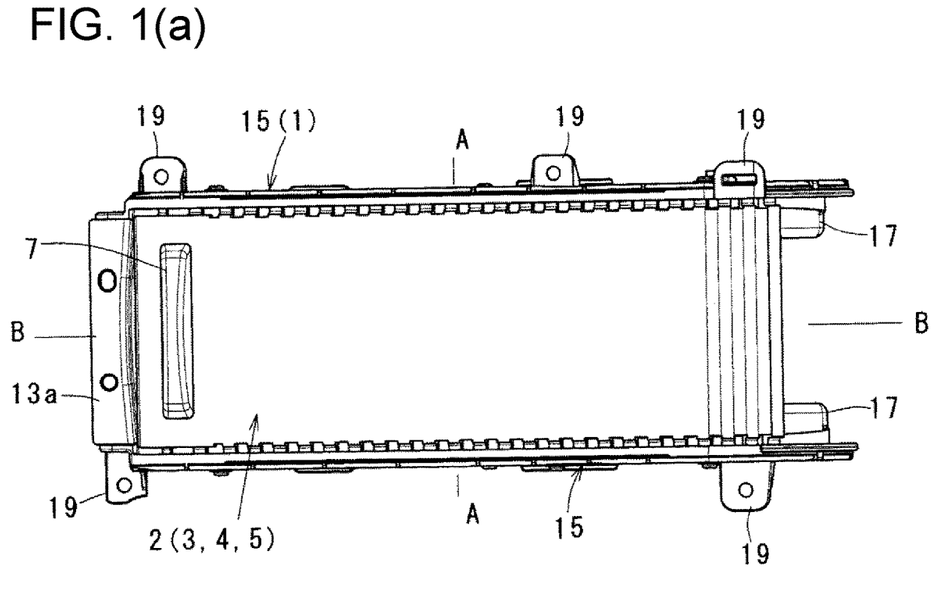
FIG. 1(a) is a top view.
Figure 1B:
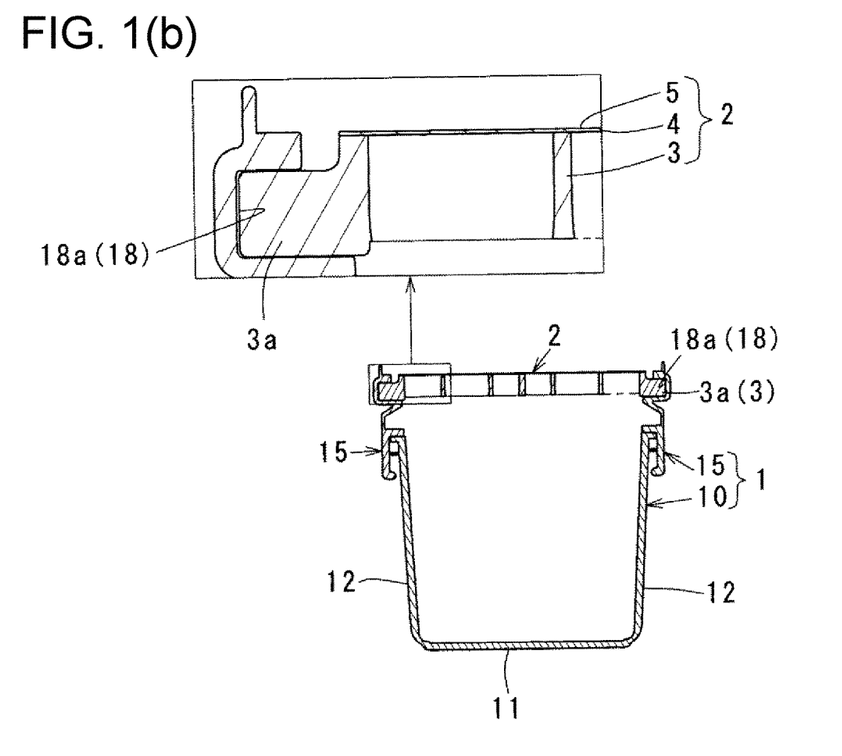
FIG. 1(b) is a cross-sectional view taken along line A-A in FIG. 1(a).

In the shutter 2 produced in the aforementioned manner, there is assembled a handle 7. The handle 7 is made of a resin molded article, and includes two hole portions 7a corresponding to the through holes 3b of the rib material 3B, and an engagement hole 7b engaging the projecting piece 3c. Then, in the handle 7, in a state wherein the projecting piece 3c of the rib material 3B, which projects from the through hole 4b of the hinge base material 4 and the through hole of the decorative film 5, is inserted into the engagement hole 7b and engaged, two screws 8 which are fasteners are screwed into the hole portions 7a from the through holes 4a of the hinge base member 4 and the through holes of the decorative film 5. Thereby, as shown in FIG. 1(a) and FIG. 3, the handle 7 is placed on a front upper side of the shutter 2.

(Operation)

Figure 2A:
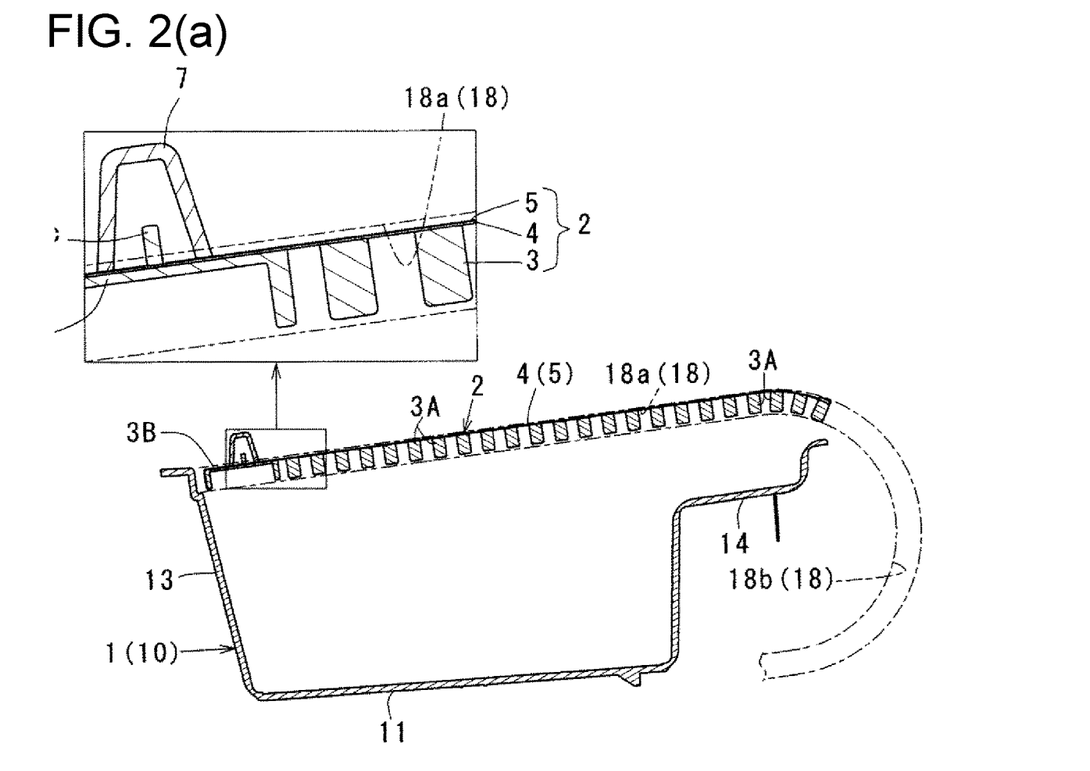
FIG. 2(a) is a closed state of the shutter.
Figure 2B:
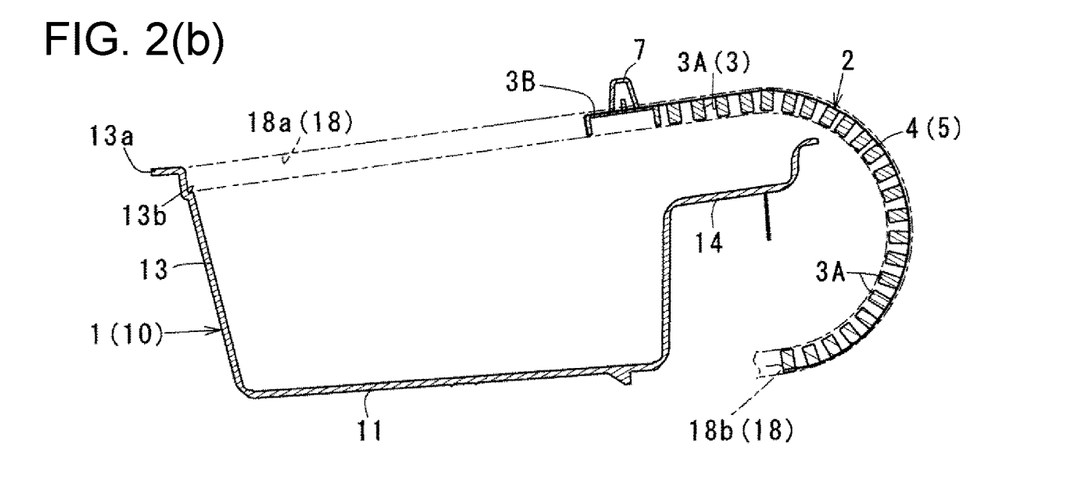
FIG. 2(b) is an open state of the shutter.

The aforementioned shutter 2 is assembled in a state wherein the respective projections 3a fit in the guide grooves 18 of the device main member 10, and from a closed state in FIG. 2(a) wherein an opening of the device main member 10 is closed, the shutter 2 slides in an open direction in FIG. 2(b), i.e., a direction of the curved portions 18b from the straight portions 18a of the guide grooves 18 using the handle 7. In this structure, in a sliding operation, even if the curved portion 18b of the guide groove 18 is curved in an approximately small circular shape, the shutter base material 3 is formed by a number of rib materials 3A and 3B, and the hinge base material 4 is the pre-preg sheet so as to improve strength, rigidity, and toughness compared to a conventional material made of resin, nonwoven fabric, and felt. Simultaneously, by changing a composition of fabrics, the thickness and the rigidity can be adjusted, and the thickness can be easily reduced so as to be capable of curving, so that when the shutter 2 slides in opening and closing directions, the sliding operation can be carried out by a force which is weaker than a conventional operating force. Also, in this structure, in a case wherein the decorative film 5 in which the pattern is printed is firmly attached to a design surface, i.e., the upper face of the pre-preg sheet which is the hinge base material 4, it is difficult to cause thermal deformation even with use for a long period of time, and excels in a creep-resistant property so as to eliminate a problem of a deterioration in an appearance due to a creep deformation. This is the same as the sheet made of the continuous fiber reinforced plastic which is produced without using the pre-preg material.

The reinforced fiber material forming the aforementioned pre-preg sheet, or the sheet made of the continuous fiber reinforced plastic can be selected considering the following respects as mentioned above.

(A) When the reinforced fiber material is formed by a continuous fiber, for example, for allowing the shutter to curve in the sliding direction, a point where the shutter bends is clear, and an operating force can be easily adjusted. Incidentally, as for a point of bending a line connecting a fitting portion of fibers, it may be structured such that a line at the bending point may be straight relative to the sliding direction.

(B) When the reinforced fiber material is formed by a woven fabric, it can increase especially the strength or rigidity, and in proportion to that, the thickness of the sheet can be reduced.

(C) In that case, as for the woven fabric, when the number of fibers placed in the sliding direction of the shutter has less than the number of fibers placed in a direction intersecting (vertical) relative to the sliding direction, for example, in a state wherein the strength of the shutter is maintained, the operating force can be adjusted lower so as to increase the degree of freedom of design.

(D) When the woven fabric is the pre-preg material using a UD (Uni-Direction) tape wherein the fibers are aligned in one direction, i.e., a unidirectional continuous fiber, the point where the shutter bends is clear, and the operating force can be easily adjusted, so that the operating force can be easily maintained constant.

Second Embodiment

This embodiment is one example wherein a shutter base material 6 forming the shutter 2 and a connecting structure between the shutter base material 6 and a hinge base material 4A are changed compared to the first embodiment. Incidentally, in this embodiment, although the decorative film is omitted, the decorative film may be integrated with the hinge base material 4A as necessary. In the explanation, in FIG. 5(a) to FIG. 8(b), the same symbols are assigned to the same or similar parts as the aforementioned first embodiment, and overlapped descriptions are omitted as much as possible.

Figure 7:
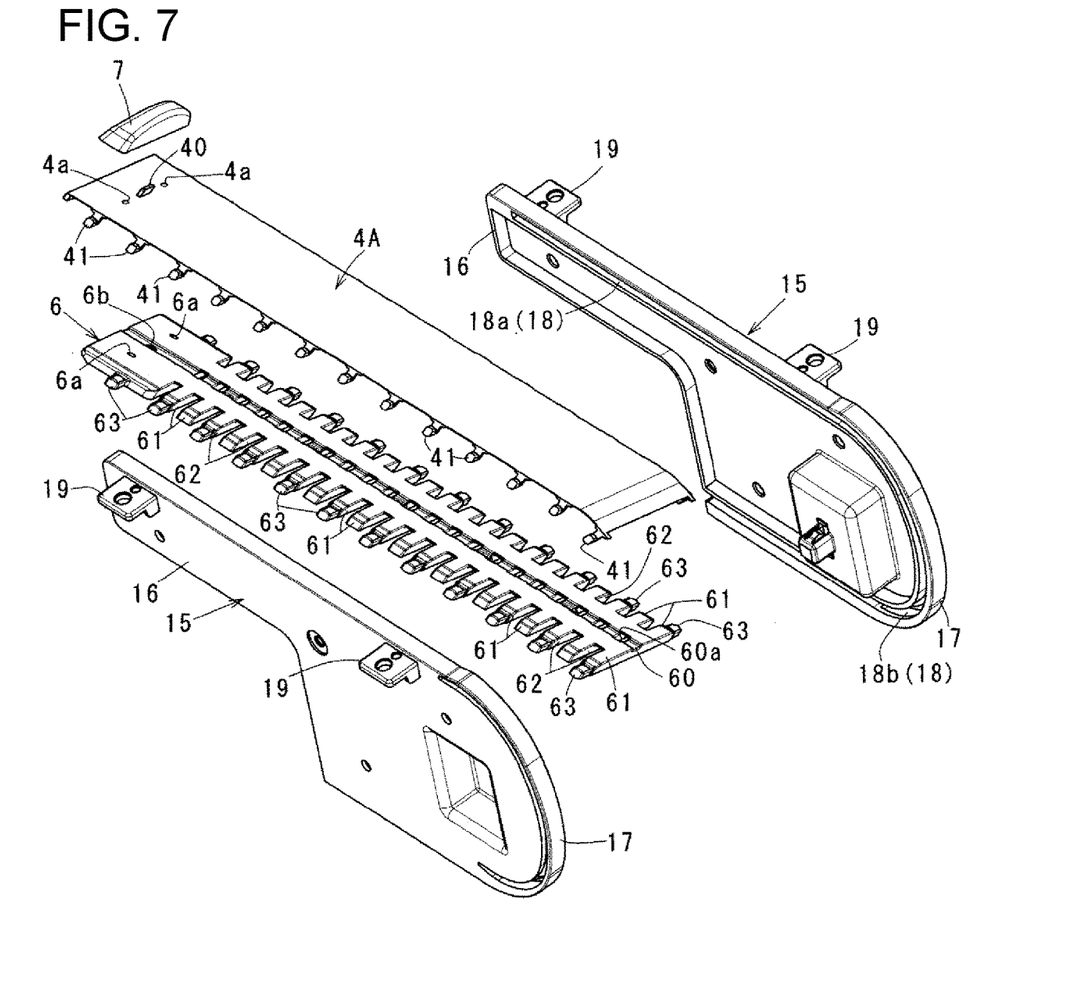
FIG. 7 is a schematic exploded perspective view showing the shutter with the guide groove of the device main member.
Figure 8A:
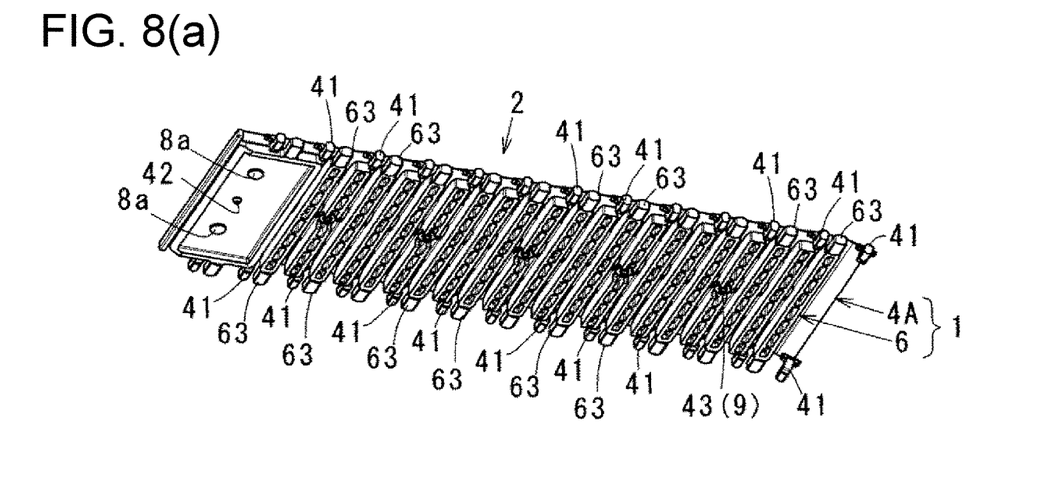
FIG. 8(a) is a perspective view in a state looked up from a lower side.
Figure 8B:
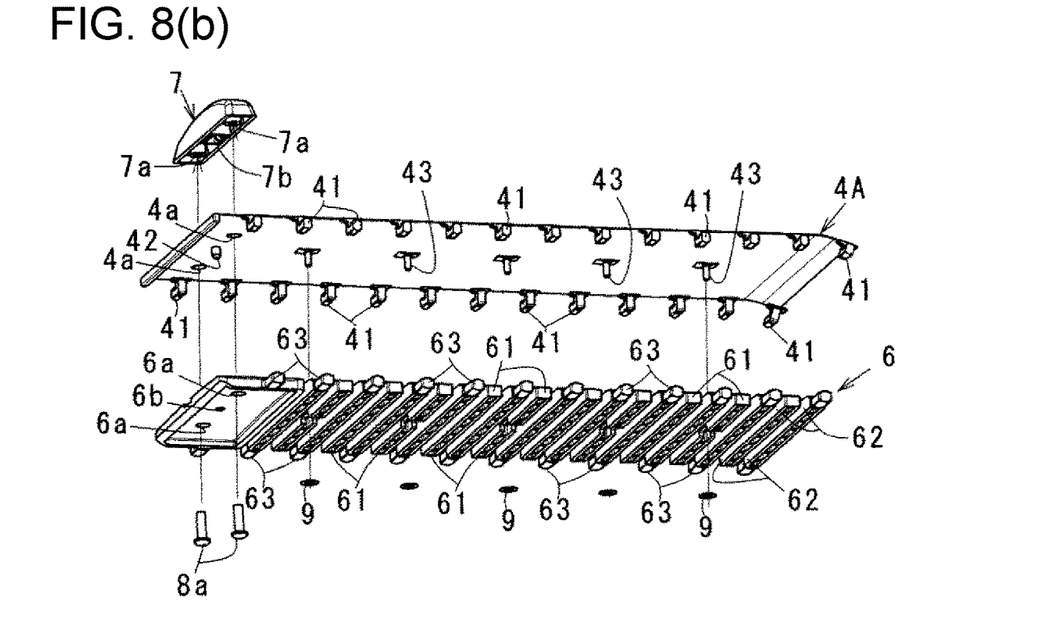
FIG. 8(b) is a structural diagram showing a relationship between the shutter base material and the hinge base material.

In the small article container device 1, the device main member 10 and the side plates 15 are substantively the same as the first embodiment. On the other hand, in the shutter 2, the shutter base material 6 is made of the rigid resin such as PA (polyamide), polyvinyl chloride, ABS (acryl butadiene styrenic polymer) and the like, and as shown in FIG. 7 and FIGS. 8(a) and 8(b), has an approximate shape with a slender double-edged saw shape, and has a total size which is slightly shorter than that of the hinge base material 4A.

Namely, the shutter base material 6 includes a long groove 60 located in a middle in a width direction and extending in a front-back direction on an upper face; engagement holes 60a located inside the groove of the long groove 60, provided at predetermined intervals, and vertically penetrating; a plurality of arm portions 61 located on both sides of the long groove 60 and divided by providing slit-shaped cut grooves 62 at equal intervals except for one portion (a portion corresponding to the rib material 3B of the first embodiment) on a front side; projections 63 provided in the arm portions 61 at one interval among the plurality of arm portions 61, projecting on tip faces of the arm portions 61, and fitting into the guide grooves 18; through holes 6a on both sides provided on the front side (the portion corresponding to the rib material 3B of the first embodiment); and an engagement hole 6b provided between the through holes 6a. The shutter base material 6 can bend in the longitudinal direction. Incidentally, the cut grooves 62 on both sides are formed as a continuous groove on a lower face of the shutter base material 6.

The hinge base material 4A is formed by the pre-preg sheet, and is connected relative to the shutter base material 6 in a state of covering the upper face of the shutter base material. The hinge base material 4A is produced by the pre-preg material wherein the resin material for matrix is impregnated or combined in the reinforced fiber material such as the carbon fiber and the like in the same manner as the first embodiment.

Also, the pre-preg sheet (or the sheet formed by the continuous fiber reinforced plastic) which is the hinge base material 4A includes a projecting piece 40 provided on a front side on an upper face; a plurality of projections 41 having an approximate L shape, provided at equal intervals along both edges on a lower face, and fitting into the guide grooves 18; a plurality of shaft portions 43 located in a middle on left and right sides on the lower face, provided at equal intervals in the longitudinal direction, and engaging the engagement holes 60a; a shaft portion 42 engaging the engagement hole 6b; and through holes 4a provided on both sides of the shaft portion 42. The projecting piece 40, the projections 41, the shaft portion 42, and the through holes 4a can be provided in corresponding portions of the hinge base material 4A by hand processing, or can be provided using the press device and the like which is used in the process of producing the pre-preg sheet from the pre-preg material.

The aforementioned hinge base material 4 is connected to the shutter base material 6 in a state wherein the respective shaft portions 43 engage the corresponding engagement holes 60a, and the shaft portion 42 engages the engagement hole 6b. The respective shaft portions 43 are fixed relative to the shutter base material 6 by placing retaining members 9 such as retaining rings and the like around shafts projecting from the engagement holes 60a. Incidentally, on the lower face of the shutter base material 6, there are provided cavities for housing the retaining members 9. In a state wherein the hinge base material 4 is connected to the shutter base material 6, the respective projections 41 on both sides are placed between the projections 63 of the shutter base material so as to fit into the guide grooves 18 with the projections 63.

Figure 5A:
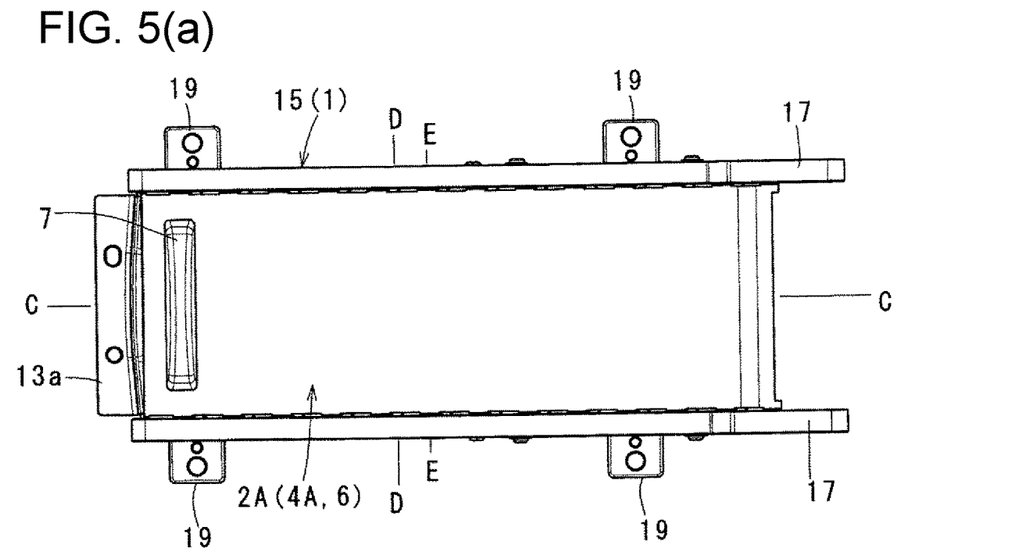
FIG. 5(a) is a top view.
Figure 5B:
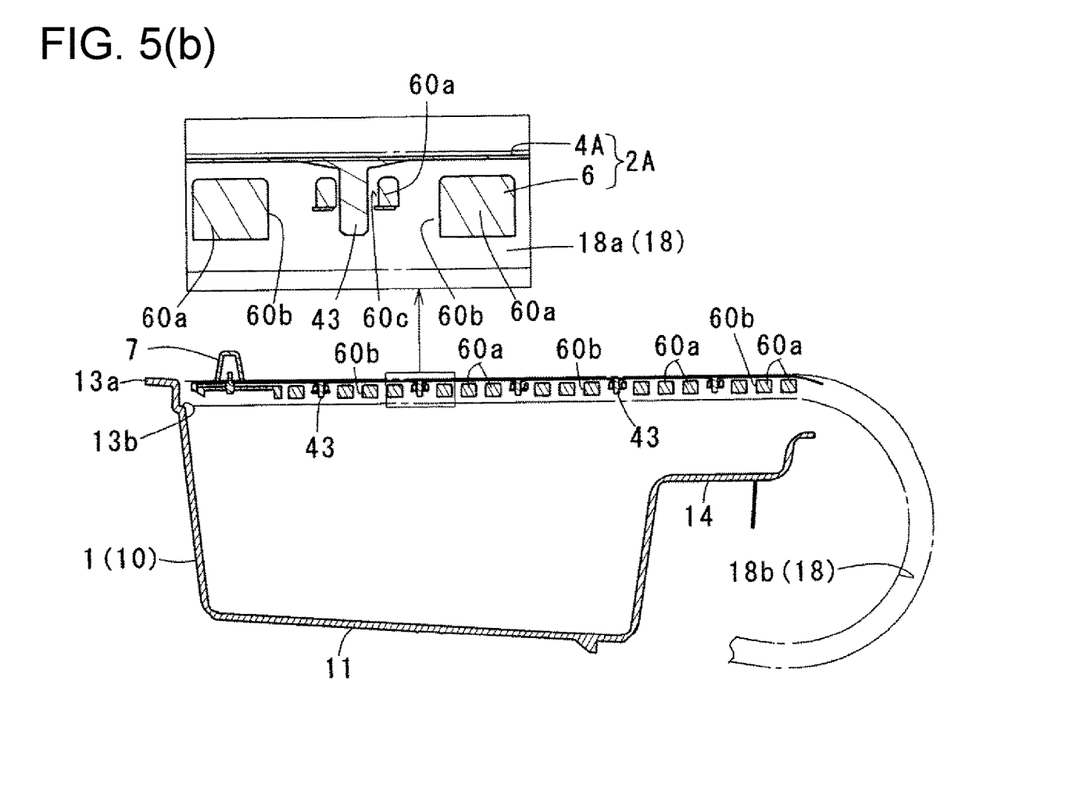
FIG. 5(b) is a cross-sectional view taken along line C-C in FIG. 5(a).
Figure 6A:
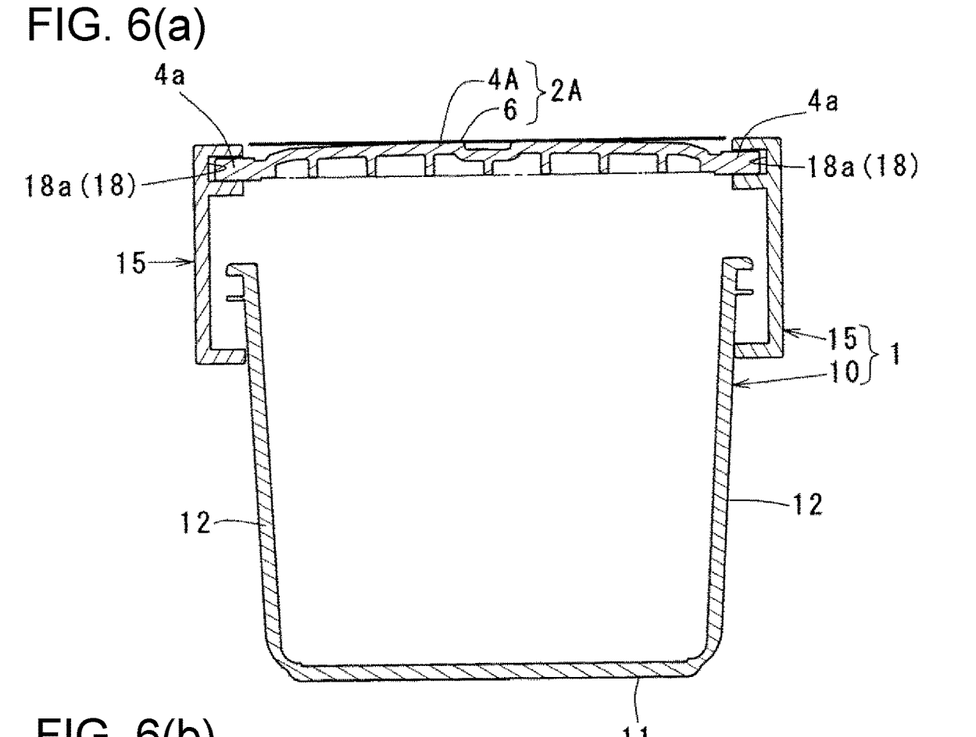
FIG. 6(a) is an enlarged cross-sectional view taken along line D-D in FIG. 5(a)
Figure 6B:
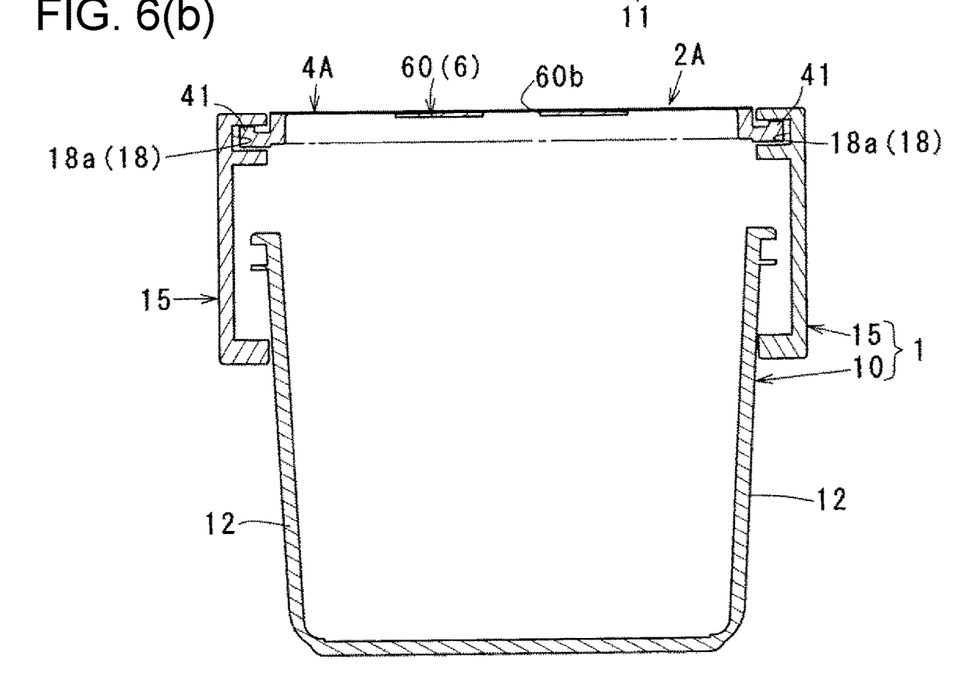
FIG. 6(b) is an enlarged cross-sectional view taken along line E-E in FIG. 5(a).

Also, in the shutter 2 produced in the aforementioned manner, there is assembled the handle 7. The handle 7 is the resin molded article, and includes two hole portions 7a corresponding to the respective through holes 4a, and an engagement hole 7b engaging the projecting piece 40. Then, in the handle 7, in a state wherein the projecting piece 40 of the hinge base material 4A is inserted into the engagement hole 7b and engaged, two pins 8a which are the fasteners are engaged with the hole portions 7a through the through holes 6a of the shutter base material 6 and the through holes 4a of the hinge base material 4A. Thereby, as shown in FIGS. 5(a) and 5(b), the handle 7 is placed on the front upper side of the shutter 2.

The aforementioned shutter 2 is assembled in a state wherein the respective projections 63 and projections 41 fit relative to the guide grooves 18 of the device main member 10, and from the closed state wherein the opening of the device main member 10 is closed, the shutter 2 slides in the open direction, i.e., the direction of the curved portion 18b from the straight portion 18a of the guide groove 18 using the handle 7. In this structure, in the sliding operation, even if the curved portion 18b of the guide groove 18 is curved in the approximately small circular shape, the shutter base material 6 is provided with a number of cut grooves 62, and the like, and the hinge base material 4A is the pre-preg sheet so as to improve the strength, rigidity, and toughness compared to the conventional resin molded article, nonwoven fabric, and the like. Simultaneously, the hinge base material 4A can be easily curved by reducing the thickness, so that when the shutter 2 slides in the opening and closing directions, the sliding operation can be carried out by the force which is weaker than the conventional operating force.

Incidentally, in the shutter of the present invention, the details can be variously changed and developed referring to each embodiment provided that they comprise structures specified in the invention. The sheet formed by the continuous fiber reinforced plastic or the pre-preg sheet, which is the hinge base material, is not limited to a structure of firmly attaching the decorative film, and the pattern may be provided in a corresponding portion of the upper face.

EXPLANATION OF SYMBOLS

1 . . . a small article container device (10 is a device main member, and 15 is side plates)
2 . . . a shutter
3 . . . a shutter base material (3a is projections, and 3b is through holes)
4 . . . a hinge base material
4A . . . a hinge base material
5 . . . a decorative film
6 . . . a shutter base material (6a is through holes, and 6b is an engagement hole)
7 . . . a handle
18 . . . guide grooves (18a is straight portions, and 18b is curved portions)

Incidentally, all contents of the specification, claims, drawings, and abstract of Japanese Patent Applications No. 2015-179606 filed on Sep. 11, 2015 are cited in their entireties herein and are incorporated as a disclosure of the specification of the present invention.

What is claimed is:

1. A shutter which is formed to be capable of bending in a sliding direction, and which slides along a pair of guide grooves including a curved portion at one portion thereof, the guide grooves being provided on two sides, facing each other, of an opening of a device main member and a shutter storage side, to open and close the opening, the shutter comprising:
a shutter base material adapted to slide along the guide grooves in a state wherein corresponding portions thereof fit into the guide grooves, the shutter base material comprising a plurality of rib materials separated from each other and arranged side by side in the sliding direction with a space therebetween;
a hinge base material disposed in such a way so as to cover outer faces of the rib materials of the shutter base material;
another rib material fixed at one end of the hinge base material at a side same as that of the rib materials and having a width in the sliding direction greater than that of each of the rib materials;
a handle disposed above the another rib material, and having an engagement hole and two hole portions; and
a decorative film firmly attached to an upper face of the hinge base material,
wherein the hinge base material is a sheet formed of a continuous fiber reinforced plastic, and made of a pre-preg material,
each of the rib materials includes a flat upper face as the outer face, a lower face having concave and convex shapes with a number of inverted concave-shaped notch portions, and one projection on each side adapted to fit into one of the guide grooves, the outer faces of the rib materials being fixed to one side of the sheet of the hinge base material individually so that the sheet is bent when sliding at the curved portion,
the another rib material having two another projections on each side perpendicular to the sliding direction adapted to engage one of the guide grooves,
the another rib material has a lower face with a shallow cavity, a positioning projecting piece extending from an upper surface thereof, and two through holes between the two another projections to sandwich the positioning projecting piece, the positioning projecting piece passing through a hole of the hinge base material, and
the handle is fixed to the another base material with the hinge base material therebetween so that two screws pass through the two through holes and engage the two hole portions and the projecting piece engages the engagement hole through the hinge base material.

2. A shutter according to claim 1, wherein a fiber of the pre-preg material is formed of a woven fabric.

3. A shutter according to claim 2, wherein the woven fabric has a number of fibers in a shutter sliding direction less than that of fibers in a direction of intersecting the shutter sliding direction.

4. A shutter according to claim 1, wherein the pre-preg material is a uni-Direction tape such that fibers are aligned in one direction.

5. A shutter according to claim 1, wherein the shutter base material and the hinge base material are capable of sliding in a state wherein respective corresponding portions fit in the guide grooves.

6. A shutter according to claim 1, wherein the shutter is a lid of a vehicle glove compartment.

7. A shutter according to claim 1, wherein each of the rib materials includes the one projection on each side perpendicular to the sliding direction adapted to engage one of the guide grooves, the one projection having two side faces in the direction perpendicular to the sliding direction to be flush with two side faces of each of the rib materials, and an upper face lower than an upper face of each of the rib materials.

* * * * *